UNITED STATES PATENT OFFICE.

GEORGE DIEFFENBACH, OF NEW YORK, N. Y.

IMPROVED METHOD OF MAKING A HARD COMPOUND OF RUBBER.

Specification forming part of Letters Patent No. 25,957, dated November 1, 1859.

*To all whom it may concern:*

Be it known that I, GEORGE DIEFFENBACH, of the city, county, and State of New York, have invented a new and useful method of hardening or curing a certain composition of matter; and I do hereby declare that the following is a full, clear, and exact description of my invention and of its application.

The nature of my invention consists in curing or hardening a composition of matter containing sulphate of alumina as an indispensible ingredient by subjecting the said composition to the action of artificial heat, as hereinafter described.

To enable others skilled in the art to make and use my invention, I will proceed to describe it.

I pulverize one pound of amber and put the same in a crucible (the inside of which ought to be glazed) over a soft-coal fire, the intensity of which is gradually increased until the amber begins to melt, when it is agitated until the whole of the pulverized amber is molten. I then take about one-half a pound of lindseed-oil and pour the same, while in a boiling state, into the molten amber and agitate the mixture. I then remove it from the fire and continue to stir it until it becomes cool. I then add to this mixture about one-half of a pound of pulverized sulphate of alumina and about three-fourths of a pound of gutta-percha or caoutchouc and about one-half of a pound of a mixture of metallic colors most near resembling the color of the natural healthy gum. The mixture of colors which I have found best for that purpose is as follows: one ounce of sulphide of cadmium, about eight ounces of oxide of tin, about two ounces of vermilion, and about two drams of a preparation made as follows: one part, by weight, of gold is dissolved in eighty parts of aquaregia, and the liquid is then dried by evaporation. Water is then added in a sufficient quantity to dilute the mixture, and one hundred and sixty parts of pulverized feldspar is incorporated into the same. The whole mass is then put into a muffle. It is therein exposed to heat until the said mass becomes red hot or annealed. It is left in that condition until all the acids are evaporated, when it is removed from the heat and pulverized. This composition is first formed and then shaped while in its green or plastic state.

If I intend to impart a certain color to the composition, the respective mineral colors are incorporated in the said composition and are developed after the hardening or curing is completed by a process not herein claimed, but described in another application for Letters Patent duly filed in Patent Office on the 13th day of April, 1859. The composition thus compounded, with or without the addition of coloring-matter and shaped, is then exposed to the action of artificial heat of about 250° Fahrenheit during a period of time ranging from one hour to eight hours. The heat may be applied either in the form of steam or of hot air or of a hot sand bath. When colors of a light hue are incorporated in the compound I prefer the application of a hot sand bath to all other forms of heat. When the compound does not contain any colors, or when dark colors are intermixed with the same, steam, heat, or hot air may be used with equal advantage.

The length of time during which the compound is left in the heat depends upon the degree of hardness which I intend to impart to the cured compound. When a considerable degree of hardness is required, as, for instance, in the making of artificial-gum plates and bases for dental purposes, it is necessary that the articles should remain in the heat from four to eight hours. If a lesser degree of hardness is required, less time will accomplish the desired result. When removed from the heat the plastic character of the composition will have disappeared, and the articles will be cured and will have acquired a consistency or hardness proportionate to the duration of the heating process.

By the application of the hardening process thus described to the composition of matter aforesaid artificial gums and other articles of manufacture may be produced in which the coloring-matter previously intermixed may be developed.

I do not claim the application of heat to any other composition of matter as my invention; but

What I claim as new, and desire to secure by Letters Patent of the United States, is—

The application of artificial heat to a composition of matter consisting of sulphate of alumina and other ingredients, substantially as described, for the purpose of curing or hardening the said composition, substantially as specified.

New York, May 20, 1859.

GEORGE DIEFFENBACH.

Witnesses:
CHARLES WEHLE,
P. S. PALMER.